United States Patent Office 3,409,693
Patented Nov. 5, 1968

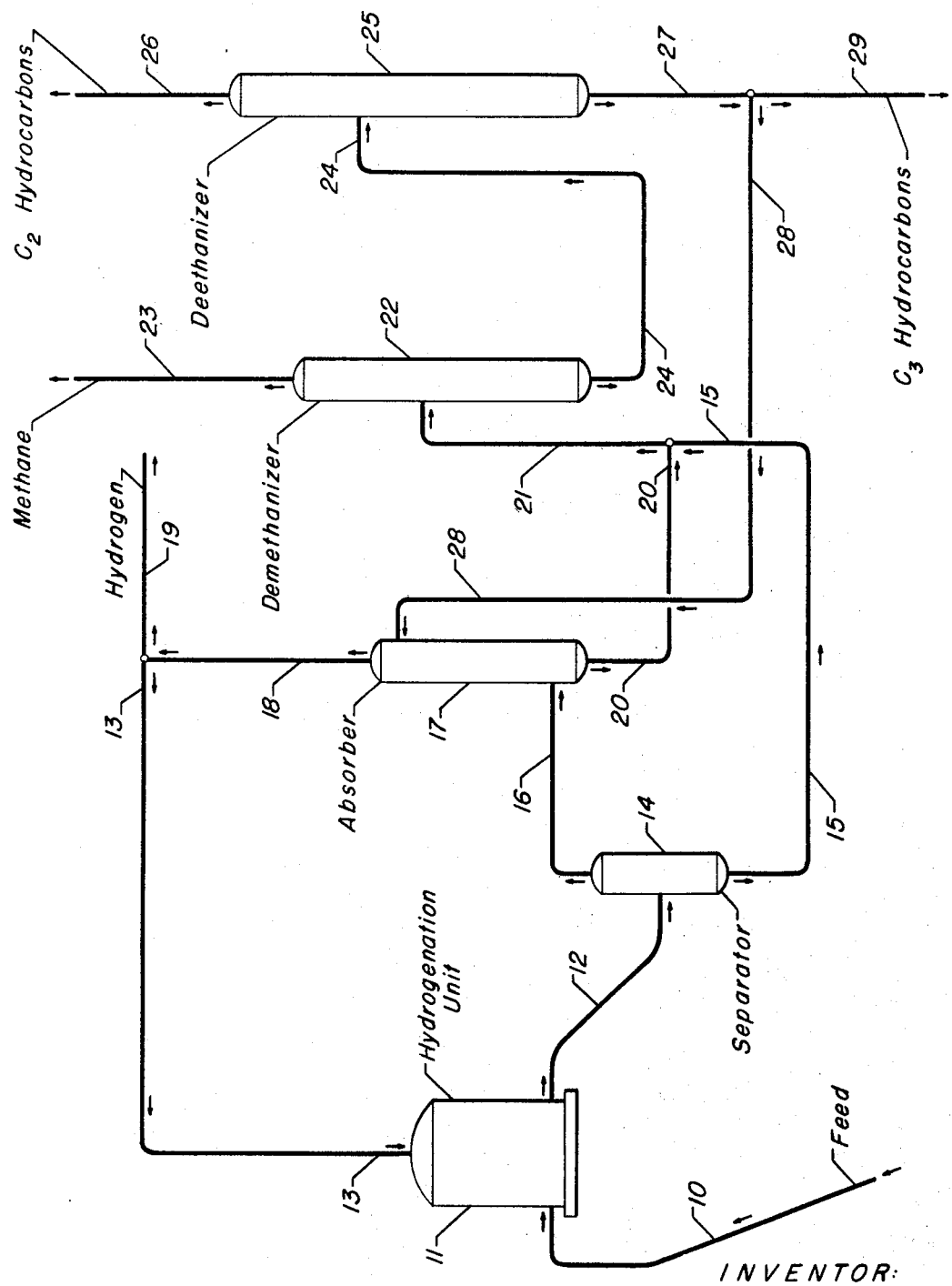

3,409,693
PROCESS FOR SEPARATING THE COMPONENTS
OF A GASEOUS MIXTURE
Robert E. McHarg, Arlington Heights, Ill., assignor to Universal Oil Products Company, Des Plaines, Ill., a corporation of Delaware
Filed Aug. 22, 1966, Ser. No. 573,893
7 Claims. (Cl. 260—677)

ABSTRACT OF THE DISCLOSURE

Process for recovering relatively pure hydrogen contained in an acetylene-contaminated gaseous stream by treatment with hydrogen to remove the acetylene and then passing the treated gas into an absorber system operating at a temperature of at least —90° F. Hydrogen of at least 75% purity is recovered from the absorber and recycled to the hydrotreater. Separate product streams of methane and ethylene are also recovered.

---

This invention relates to the separation of gases. It particularly relates to a process for separating the components of a gaseous mixture comprising hydrogen and $C_1$ to $C_3$ hydrocarbons. It also relates to a process of separating $C_3$ hydrocarbons. It also relates to a process of separating normally gaseous components for the recovery of ethylene therefrom. It specifically relates to a combination process for purifying hydrogen and recovering ethylene in high concentration from a principally gaseous mixture comprising hydrogen and $C_1$ to $C_3$ hydrocarbons contaminated with acetylenic compounds. This invention also relates to my copending application Ser. No. 573,894, entitled "Purification of Hydrogen Containing Gaseous Streams," filed on even date herewith.

In refinery practice, various processes commonly employed in refining petroleum products yield by-product gases containing hydrogen in admixture with methane and other light hydrocarbons, such as ethylene, ethane, propylene, propane, butenes, butadienes, acetylenes, butanes, etc. Examples of processes which produce by-product gases such as above described, are thermal cracking; catalytic cracking, both moving bed and fluid bed-type operations; catalytic reforming; various combinations of these processes, and the like. The concentration of hydrogen in these gases usually is too low to permit its use directly in other processes, such as synthesis of ammonia, hydrogenation of edible fats, the hydrotreating of lubricating oils, etc. Therefore, it is desirable to separate and recover the hydrogen from such other gases for use in refinery operations.

Also, ethylene has become of increasing importance as a raw material and is useful in the manufacture of synthetic chemical products, plastics, lubricants, and fuels. Therefore, it is desirable to recover ethylene in high concentration from these by-product principally gaseous mixtures.

To economically purify hydrogen and recover ethylene in high concentration from gaseous mixtures requires the removal of objectionable contaminants, including sulfur compounds, acetylenic compounds, carbon dioxide, and carbon monoxide. The acetylenic compounds are particularly objectionable and usually present the more difficult problem for removal in normal refinery practice.

Accordingly, it is an object of this invention to provide a process for separating gases.

It is another object of this invention to produce high purity hydrogen from gaseous fractions containing hydrogen and other low molecular weight gases.

A further object of this invention is to produce high purity hydrogen and high purity ethylene from gaseous fractions which are contaminated particularly with acetylenic compounds in a more economical and facile manner.

A still further object of this invention is to provide a process for separating the components of the gaseous mixture comprising hydrogen and $C_1$ and $C_3$ hydrocarbons contaminated with acetylenic compounds which effects a substantial saving in heating and cooling requirements.

These and other objects of the present invention will be obvious to those skilled in the art from the description presented hereinbelow with reference to the appended drawing which is a schematic flow diagram illustrating on specific embodiment of the invention.

According to this invention, an improvement in a process for separating the components of a gaseous mixture comprising hydrogen and $C_1$ to $C_3$ hydrocarbons contaminated with acetylenic compounds in which a demethanizing fractionating column is employed and the feed mixture is contacted with a lean oil in an absorber prior to demethanizing, comprises the steps of introducing said mixture into a hydrogen treating zone under conditions sufficient to remove acetylenic compounds therefrom, circulating the lean oil in contact with the treated mixture in an absorber under conditions sufficient to remove substantially all of said $C_1$ to $C_3$ hydrocarbons such that the hydrogen off-gas stream from the absorber comprises at least 75% by volume hydrogen, and returning at least part of said off-gas to the treating zone as part of said treating conditions.

A particular embodiment of this invention relates to a process for purifying hydrogen and recovering ethylene in high concentration from a principally gaseous mixture comprising hydrogen and $C_1$ to $C_3$ hydrocarbons contaminated with acetylenic compounds which comprises the steps of (a) introducing said gaseous mixture into a hydrogen treating zone under conditions sufficient to remove acetylenic compounds therefrom; (b) introducing the treated mixture into a separation zone under conditions including a temperature from —40° F. to —80° F. sufficient to separate the treated mixture into a vapor product comprising hydrogen and methane and a liquid product comprising hydrocarbons substantially free from hydrogen; (c) passing said vapor product into an absorber and contacting therein with a hereinafter specified lean oil under conditions including a temperature of at least —90° F. sufficient to absorb methane while substantially rejecting hydrogen; (d) removing from the absorber a purified hydrogen stream comprising at least 75% by volume hydrogen; (e) returning at least a portion of said purified hydrogen stream to said treating zone Step (a) as part of said conditions therein; (f) withdrawing from the absorber a rich oil stream comprising said lean oil and absorbed hydrocarbons; (g) introducing said rich oil and said liquid product from Step (b) into a demethanizing fractionating column under conditions sufficient to form an overhead product comprising methane and a bottoms product comprising $C_2$ and $C_3$ hydrocarbons; (h) passing the bottoms product of the demethanizer into a deethanizing zone wherein said bottoms product is separated into a $C_2$ hydrocarbon fraction comprising ethane and ethylene and a $C_3$ hydrocarbon fraction comprising propane and propylene; (i) returning a $C_3$ hydrocarbon to the absorber as said lean oil specified; and (j) recovering ethylene in high concentration from $C_2$ hydrocarbon fraction.

A specific embodiment of this invention includes the process wherein said vapor product from Step (b) is cooled to a temperature of at least $-90°$ F. by autorefrigeration means prior to the absorbing step.

In conventional refinery practice the normally gaseous mixture, such as that removed from a fluid catalytic cracking unit, is first introduced into a depropanizing zone where an overhead stream is taken which comprises components having a boiling point equal to or lower than propane. A bottoms fraction is also removed from the depropanizer and usually comprises components having at least four carbon atoms per molecule. The process of this invention begins with a feed stream which is typically the overhead fraction from a conventional depropanizer column. The operating conditions for the depropanizer operation are well known to those skilled in the art and need not be presented herein detail. However, typical top temperatures of the depropanizer are from $+10°$ F. to $-10°$ F. The typical bottom temperature of the depropanizer is about $225°$ F.

The extent and amount of treating of the gaseous mixture which now comprises hydrogen and $C_1$ to $C_3$ hydrocarbons contaminated with acetylenic compounds, depends upon the source of the gaseous feed mixture and the types of undesirable contaminants present. It would generally be desired to remove the water from the overhead stream so as to avoid hydrate formation and plugging of the cold downstream equipment. Therefore, a dryer will generally always be present in the treating section. In addition, other objectionable contaminants such as sulfur compounds, carbon dioxide, carbon monoxide, are removed by means well known to those skilled in the art. For example, these contaminants may be removed by gas purification treatment, such as scrubbing of the gaseous mixture with compounds selective for these impurities, such as amines, e.g. ethanolamine, caustic wash, and water wash. It is preferable, of course, to finish all of the treating before drying so as to completely remove sufficient water to prevent hydrate formation in the later cold downstream equipment.

As is known in the art, it is also desirable to perform the compression of the feed mixture to the highest pressure in the system and physically separate all of the condensed water thereby prior to the drying step in order to reduce the amount of water to be removed by the dryers. Typically, the highest pressure will be in the range of from 400 to 600 p.s.i.a. with preferable pressures being in the range from 500 to 550 p.s.i.a.

In accordance with the practice of the present invention, the undesirable contaminant acetylene is removed by selective hydrogenation wherein the acetylene is converted to ethylene over a suitable hydrogenation catalyst, such as a chromium-cobalt-molybdenum catalyst, or other well known hydrogenation catalysts. The operation conditions for the hydrogen treating zone include a temperature from $100°$ F. to $700°$ F., a pressure from atmospheric to 500 p.s.i.g., and a weight hourly space velocity of from 0.5 to 10,000, preferably from 1000–7000. These conditions are chosen such that the concentration of the acetylenic compounds in the treated gas from the hydrogen treated zone is less than 100 parts per million (p.p.m.), preferably less than 10 p.p.m.

The hydrogen treatment can be carried out in vapor phase, liquid phase, or as a mixed vapor-liquid phase. Because of the exothermic nature of the hydrotreating reactions, there may be an increased temperature in the catalyst bed. Therefore, it is of particular advantage to operate in the liquid phase. Because of the higher specific heat in the liquid there will generally be smaller rises in temperature than when operating in the gaseous phase. If desired, diluents can be added to the reaction zone to absorb the exotherimc heat of reaction.

To assure satisfactory hydrogenation, hydrogen is added in an amount at least equal to the stoichiometric requirements for the conversion of the acetylene to, say, the monoolefin, to up to ten times or more of the theoretical amount. In the practice of this invention it is preferred to use from 2 to 5 times the theoretical amount of hydrogen necessary for the stoichiometric reaction.

Part of the inventive concept of the present invention, as previously discussed, is the employment of a hydrogen-containing gas mixture which has been purified in a subsequent but interrelated and interdependent step, and which is recycled at least in part to the hydrogen treating zone from the absorbing zone more fully discussed hereinafter.

The invention is more specifically illustrated in the accompanying drawing which illustrates the preferred arrangement of apparatus for conducting the process of the present invention.

Referring now to the drawing, a principally gaseous mixture comprising hydrogen and $C_1$ to $C_3$ hydrocarbons, contaminated with acetylenic compounds, is passed via line 10 into hydrogenation unit 11 which operates in accordance with the conditions previously mentioned hereinabove. The hydrogen required for the reaction is introduced into hydrogenation unit 11 via line 13 more fully discussed hereinafter.

The treated gas now containing preferably less than 10 p.p.m. acetylenic compounds, is withdrawn from hydrogenation unit 11 and passed via line 12 into separator 14 at a temperature in the range from $-40°$ F. to $-80°$ F., the temperature being sufficient to separate the treated gaseous mixture into a vapor product comprising hydrogen and methane and a liquid product comprising hydrocarbons substantially free from hydrogen. Typically, the temperature in separator 14 will be $-70°$ F. Under this typical condition substantially all of the hydrogen and approximately half of the methane, will be in the vapor product.

Accordingly, the vapor product now comprising hydrogen and methane is passed via line 16 into absorber 17. A lean oil comprising propane, or a propane-propylene mixture, from a source hereinafter described, passes through line 28 and enters the top of absorber 17. The temperature of the lean oil is controlled by means not shown so as to maintain absorber 17 at a temperature of at least $-90°$ F., and preferably at a temperature of $-100°$ F. The lean oil under these conditions will absorb substantially all of the hydrocarbons including the methane. As used herein the term "at least $-90°$ F." refers to the warmest temperature (or minimum cold temperature) contemplated in absorber 17 and includes all temperatures colder than $-90°$ F.

A purified hydrogen stream of at least 75% by volume hydrogen and typically approximately 90% by volume hydrogen, is removed from absorber 17 by means of conduit 18. At least a portion of the purified hydrogen stream in line 18 is recycled to the hydrogenation unit via line 13 as previously discussed. A net purified hydrogen stream may be removed from the process via line 19 for further use.

The temperature control in absorber 17 is preferably aided by cooling the hydrogen-methane stream in line 16 to a temperature of at least $-90°$ F., preferably to a temperature of $-100°$F. This cooling of the hydrogen-methane stream may be accomplished by external refrigeration means, or, preferably for the practice of this invention, by autorefrigeration means in line 16 in which event a compressor may be needed (not shown) in line 13 for recycle of the hydrogen. The autorefrigeration for further chilling of the hydrogen-methane stream is accomplished by expanding the gaseous stream through a suitable expansion device, such as a pressure reducing value, so that the Joule-Thompson effect will drop the temperature appropriately. Those skilled in the art, with the teachings of this specification, will know how to operate the cooling means in line 16 to suitably control the temperature of absorber 17 at its predetermined temperature.

The rich oil leaves absorber 17 by means of conduit 20 where it passes into admixture with the liquid product from separator 14 being withdrawn through line 15. The admixed stream passes via line 21 into demethanizer column 22. Due to the fact that substantially all of the hydrogen has now been removed from the normally gaseous hydrocarbons, the operating temperatures in demethanizer 22 may be substantially higher, e.g. −110° F. to −130° F. versus −140° F. to −150° F., than would normally be required to liquify the top portion of demethanizer 22. The methane, of course, must be liquified at an extremely low temperature. If this temperature is not maintained at the top of demethanizer 22, there will be an unavoidable loss of ethylene out of the overhead fraction. A substantially pure hydrocarbon stream comprising methane is removed from demethanizer 22 via line 23.

In the practice of this illustrative embodiment of the invention, the demethanizer is operated at a pressure of about 550 p.s.i.a., while maintaining a top temperature of from −90° F. to −130° F., and a bottom temperature of from 40° F. to 100° F.

The demethanizer bottom fraction is removed through line 24 where the pressure is reduced to about 350 p.s.i.a., and introduced into a deethanizer column 25. This bottom fraction now comprises ethane, ethylene, propane and propylene.

Deethanizer 25 is a fractionating column operated to separate the demethanizer bottom fraction into an overhead stream comprising ethane and ethylene, and a bottom stream comprising propane and propylene. At a pressure of about 350 p.s.i.a., typical top temperatures of about 0° F., and typical bottom temperatures of about 150° F., are employed to make the above split. The deethanizer overhead fraction is removed through line 26 for further separation into a substantially pure ethylene stream as specified and a substantially pure ethane stream by fractionating means not shown. In the practice of this invention unique economic advantages can be obtained by carrying out this later fractionation such that ethylene in high concentration can be recovered from the practice of the process.

The deethanizer 25 bottom fraction is removed through line 27. A portion of the deethanizer bottom fraction is recycled to absorber 17 by means of line 28 and comprises the lean oil as specified. Alternatively, this fraction, comprising propane and propylene, can be separated into substantially pure propylene and a substantially pure propane stream by means not shown. The practice of this invention embodies the returning of the resulting propane stream to absorber 17 as said lean oil.

The operating conditions on the ethylene fractionating column, mentioned hereinabove but not shown on the appended drawing, are well known to those skilled in the art. Typically, the column will operate at a pressure of about 150 p.s.i.a., with typical top temperatures of about −60° F., and typical bottom temperatures of about −20° F. being employed.

From the above description it is seen that this invention is based on a combination process which recovers not only a high purity hydrogen stream as a separate product, a high purity methane stream as a separate product, but also recovers ethylene in high concentration from the gaseous feed mixture. Additionally, at least part of the inventive concepts of this combination process resides in purifying the hydrogen to such an extent that at least a portion of the hydrogen stream can be satisfactorily recycled to the hydrogenation unit which is used to remove the acetylenic compounds from the gaseous feed mixture. Clearly, this processing sequence effects considerable economies of operation over previous prior art schemes. For example, the utility of separator 14 allows the size of absorber 17 to be considerably reduced since all hydrocarbons boiling above methane do not pass through the absorber. Also, since absorber 17 only has to selectively remove methane from hydrogen, the heat of solution is necessarily reduced; therefore the conventional intercooling devices on such an absorber can be significantly reduced in size. It is also to be noted that the hydrogen stream in line 19 and the methane stream in line 23 can be maintained at a satisfactorily high pressure in the system for use within a typical refinery battery limit without further compression being required.

Another advantage of the present invention is the use of a stream comprising propane, or propane-propylene, as the lean oil in absorber 17. Since this mixture has a low molecular weight, the number of mols per unit weight is high. As those skilled in the art know well, a critical factor in the design of absorbers is the mol ratio of liquid to vapor. Since the liquid contains a higher number of mols per unit weight, less pounds of lean oil will have to be pumped to absorb the required amount of gas. Further, when separating hydrogen from methane while simultaneously recovering ethylene in high concentration from normally gaseous hydrocarbon mixture, propane and/or propylene are invariably present in the feed mixture. Since these components would have to be separated from the hydrogen, methane and ethylene anyway, it is distinctly preferable to use additional amounts of these $C_3$ hydrocarbons as the specified lean oil. Therefore, it becomes unnecessary to furnish an additional stripping step of the rich oil since the absorber oil is a component that would be present in any event. In effect, therefore, demethanizer 22 not only operates to recover methane in substantially pure form, but also operates as a purifying column for the rich oil.

As mentioned previously, it is also possible to eliminate the depropanizer from the processing sequence if the feed does not contain an appreciable quantity of hydrocarbon having more than 5 carbon atoms per molecule, since these heavier hydrocarbons will also be absorbed in the absorber, passed through the bottoms of the demethanizer and the deethanizer, and a portion thereof used as lean oil. The presence of a depropanizer will depend upon the composition of the feed stock and the importance of obtaining a substantially pure propane-propylene mixture.

As used herein, "$C_1$ hydrocarbon" comprises methane, "$C_2$ hydrocarbons" comprise ethane, ethylene, or mixtures thereof, and "$C_3$ hydrocarbons" comprise propane, propylene, or mixtures thereof.

EXAMPLE

The following example is introduced for the purpose of further illustrating the novelty and utility of the present invention. A gaseous stream from a fluid catalytic cracking unit is processed in accordance with the flow scheme shown in the appended drawing. After removal of acetylenes by hydrogenation using the technique of this invention Table I represents the separation of the gaseous components in accordance with the present invention using typical processing conditions previously described hereinabove. However, the stream analysis data shown in the table is presented in a manner which excludes the amount of absorber oil being circulated through the system (about 314 moles per hour).

It is noted from Table I that the hydrogen purity is in excess of 75% by volume and typically is in excess of 90% by volume. The hydrogen in line 18 is recycled to the hydrogenation zone for use therein to remove acetylenic compounds. Ethylene is subsequently recovered in a purity of 99.9% by volume, with an overall ethylene recovery of above 91% by volume.

TABLE I
[Temperature of Separator 14= —70° F.]

| Line No. | 12 | 15 | 16 | 18 | 20 | 21 | 23 | 24 | 26 | 27 |
|---|---|---|---|---|---|---|---|---|---|---|
| Mol/Hour: | | | | | | | | | | |
| $H_2$ | 332 | 2 | 330 | 321 | 9 | 11 | 11 | | | |
| $CH_4$ | 317 | 157 | 160 | 32 | 128 | 285 | 285 | | | |
| $C_2H_4$ | 175 | 117 | 58 | 1 | 57 | 174 | 3 | 171 | 171 | |
| $C_2H_6$ | 242 | 242 | | | | 242 | | 242 | 242 | |
| $C_3H_6$ | 318 | 318 | | | | 318 | | 318 | 9 | 309 |
| $C_3H_8$ | 194 | 194 | | | | 194 | | 194 | 3 | 191 |
| $C_4+$ | 3 | 3 | | | | 3 | | 3 | | 3 |
| Total | 1,581 | 1,033 | 548 | 354 | 194 | 1,227 | 299 | 928 | 425 | 503 |

The invention claimed:

1. In a process for separating the components of a gaseous mixture comprising hydrogen and $C_1$ to $C_2$ hydrocarbons contaminated with acetylenic compounds in which a demethanizing fractionating column is employed to produce a high purity product stream comprising methane and the feed mixture is contacted with a lean oil in an absorber prior to demethanizing, the steps of subjecting said gaseous mixture to selective hydrogenation in a hydrogenation zone under conditions including the presence of hereinafter specified hydrogen stream sufficient to convert acetylenic compounds to ethylenic compounds, passing the substantially acetylene-free mixture from the hydrogenation zone to an absorber in contact with the lean oil under conditions sufficient to absorb substantially all of said $C_1$ to $C_3$ hydrocarbons such that the hydrogen off-gas stream from the absorber comprises at least 75% by volume hydrogen, and returning at least part of said off-gas to the hydrogenation zone as part of said hydrogenating conditions.

2. The steps according to claim 1 wherein said absorber conditions include a temperature of at least —90°F.

3. The steps according to claim 1 wherein said lean oil comprises a portion of the $C_3$ hydrocarbons originally in said acetylene-free mixture and said acetylene-free mixture is fed to the absorber at a temperature of at least —90°F.

4. The steps according to claim 3 wherein said feed mixture is a fraction from the gaseous product of a fluid catalytic cracking process unit.

5. Process for purifying hydrogen and recovering ethylene in high concentration from a principally gaseous mixture comprising hydrogen and $C_1$ to $C_3$ hydrocarbons prises the steps of (a) introducing said gaseous mixture into a selective hydrogenation zone under conditions including the presence of hereinafter specified hydrogen stream sufficient to remove acetylenic compounds therefrom;

(b) introducing the substantially acetylene-free mixture into a separation zone in the substantial absence of any recycle stream under conditions including a pressure from 400 p.s.i.g. to 600 p.s.i.g. and a temperature from —40° F. to —80° F. sufficient to separate the treated mixture into a vapor product comprising hydrogen and methane and a liquid product comprising hydrocarbons substantially free from hydrogen;

(c) passing said vapor product into an absorber and contacting said vapor product therein with a hereinafter specified lean oil under conditions including a temperature of at least —90° F. sufficient to absorb methane while substantially rejecting hydrogen;

(d) removing from the absorber a purified hydrogen stream comprising at least 75% by volume hydrogen;

(e) returning at least a portion of said purified hydrogen stream to said hydrogenation zone (Step (a)) as part of said conditions therein;

(f) withdrawing from the absorber a rich oil stream comprising said lean oil and absorbed hydrocarbons;

(g) introducing said rich oil and said liquid product from Step (b) into a demethanizing fractionating column under conditions sufficient to form an overhead high purity product comprising methane and a bottoms product comprising $C_2$ and $C_3$ hydrocarbons;

(h) passing the bottoms product of the demethanizer into a deethanizing zone wherein said bottoms product is separated into a $C_2$ hydrocarbon fraction comprising ethane and ethylene, and a $C_3$ hydrocarbon fraction comprising propane and propylene;

(i) returning a $C_3$ hydrocarbon to the absorber as said lean oil specified; and, (j) recovering ethylene in high concentration from said $C_2$ hydrocarbon fraction.

6. Process according to claim 5 wherein said hydrogenation conditions include a hydrogenation catalyst, a temperature from 100° F. to 700° F., a pressure from atmospheric to 500 p.s.i.g., and a weight hourly space velocity of from 0.5 to 1000 such that the concentration of acetylenic compounds in said heated gas is less than 100 p.p.m.

7. Process according to claim 5 wherein said $C_3$ hydrocarbon of Step (i) comprises at least a portion of the $C_3$ hydrocarbon fraction of Step (h).

References Cited
UNITED STATES PATENTS

| | | | |
|---|---|---|---|
| 2,451,136 | 10/1948 | Wenzke | 55—48 X |
| 2,671,791 | 3/1954 | Egbert | 260—683 X |
| 2,719,816 | 10/1955 | Rich | 55—51 X |
| 2,813,920 | 11/1957 | Cobb | 55—51 X |

REUBEN FRIEDMAN, *Primary Examiner.*

R. W. BURKS, *Assistant Examiner.*